United States Patent
Gardner et al.

(10) Patent No.: US 6,725,429 B1
(45) Date of Patent: Apr. 20, 2004

(54) SYSTEM AND METHOD FOR PRESENTING AND PROCESSING DOCUMENTS ON THE INTERNET

(75) Inventors: David P. Gardner, Southbury, CT (US); Mark Bresnan, Newtown, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/222,196

(22) Filed: Dec. 29, 1998

(51) Int. Cl.[7] .............................................. G06F 15/00
(52) U.S. Cl. .................... 715/530; 715/500; 705/34; 705/40
(58) Field of Search .................. 707/530, 513, 707/501.1; 705/40, 34; 715/501.1, 513, 530, 500

(56) References Cited

U.S. PATENT DOCUMENTS

| | | | |
|---|---|---|---|
| 5,383,113 A | 1/1995 | Kight et al. | 364/401 |
| 5,465,206 A | 11/1995 | Hilt et al. | 364/406 |
| 5,479,411 A | 12/1995 | Klein | 370/110.1 |
| 5,493,692 A | 2/1996 | Theimer et al. | 455/26.1 |
| 5,513,126 A | 4/1996 | Harkins et al. | 364/514 |
| 5,684,965 A | 11/1997 | Pickering | 395/234 |
| 5,699,528 A * | 12/1997 | Hogan | 705/40 |
| 5,710,884 A * | 1/1998 | Dedrick | 345/866 |
| 5,761,650 A | 6/1998 | Munsil et al. | 705/34 |
| 5,790,790 A | 8/1998 | Smith et al. | 395/200.36 |
| 5,802,498 A | 9/1998 | Comesanas | 705/22 |
| 5,832,460 A | 11/1998 | Bednar et al. | 705/27 |
| 5,845,267 A * | 12/1998 | Ronen | 379/114.19 |
| 5,956,693 A | 9/1999 | Geerlings | 705/14 |
| 5,963,925 A | 10/1999 | Kolling et al. | 705/40 |
| 5,995,606 A * | 11/1999 | Civanlar et al. | 370/352 |
| 6,016,509 A * | 1/2000 | Dedrick | 705/14 |
| 6,032,134 A * | 2/2000 | Weissman | 705/16 |
| 6,044,362 A | 3/2000 | Neely | 705/34 |
| 6,047,268 A * | 4/2000 | Bartoli et al. | 705/35 |
| 6,078,907 A * | 6/2000 | Lamm | 705/40 |
| 6,145,031 A * | 11/2000 | Mastie et al. | 710/40 |
| 6,151,600 A * | 11/2000 | Dedrick | 707/10 |
| 6,175,823 B1 * | 1/2001 | Van Dusen | 705/26 |
| 6,253,229 B1 * | 6/2001 | Nielsen et al. | 709/203 |
| 6,256,624 B1 * | 7/2001 | Pollard et al. | 707/3 |
| 6,282,552 B1 * | 8/2001 | Thompson et al. | 707/505 |
| 6,289,322 B1 | 9/2001 | Kitchen et al. | 705/40 |
| 6,304,857 B1 * | 10/2001 | Heindel et al. | 707/506 |
| 6,430,282 B1 * | 8/2002 | Bannister et al. | 379/211.02 |
| 6,442,588 B1 * | 8/2002 | Clark et al. | 709/203 |
| 6,453,162 B1 * | 9/2002 | Gentry | 455/433 |

OTHER PUBLICATIONS

The Journal of Electronic Commerce, Trends/Issues, "Electronic Bill Presentment and Payment: The Next Step for the E–Commerce Market", Thomas F. Horan, 1998.

* cited by examiner

*Primary Examiner*—Stephen S. Hong
*Assistant Examiner*—Cong Lac Huynh
(74) *Attorney, Agent, or Firm*—Michael J. Cummings; Angelo N. Chaclas; Charles R. Malandra, Jr.

(57) ABSTRACT

A digital document delivery system and method for providing to a user an electronic primary document with associated secondary documents. The secondary documents can have relative priorities and are based upon user preference data. An electronic inserter, bill processing server and interactive bill presentation server are used to make the primary and secondary documents available for viewing by a user via the user's web browser, as well as to allow the user to interrogate the system and to respond to the primary document, such as to pay an account due as stated in the primary document. The digital document delivery system and method also notifies the user of the existence of a primary and secondary documents for viewing.

17 Claims, 4 Drawing Sheets

SYSTEM AND METHOD FOR PRESENTING AND PROCESSING DOCUMENTS ON THE INTERNET

FIELD OF THE INVENTION

The present invention relates to an electronic mail delivery mechanism, particularly for the use via the Internet.

BACKGROUND OF THE INVENTION

Many businesses currently send out mass mailings to their customers or prospective customers for various business reasons. For example, a public utility such as an electrical power generating company may generate and send out hundreds of thousands of bills to its customers each month. As another example, a company may wish to send targeted marketing information, such as a sales letter to prospective customers on a mailing list. In either example, the company may wish to augment the bill or basic sales letter with additional secondary material generally referred to as "inserts", which, in many cases, are related to specific information about the particular customer or prospective customer to which it is sent. Various companies produce mail inserting systems, such as the Pitney Bowes Production Mail Center 2000, for purposes of generating mass mailings with such inserts.

Companies that use such mail inserting systems to generate mass mailings typically use older computer systems, sometimes referred to as "legacy" computer systems due to the relative age of the computer hardware and software to generate the print data stream. These "legacy" computer systems are still found to be effective for purposes of doing mass billings and thus it is desirable to continue to use the output print stream from such computer systems for purposes of generating electronic mass mailings. Applicant's co-pending U.S. application Ser. No. 08/968,649, now Pat. No. 6,343,327, having Attorney Docket Number E-632 describes such a system and method for electronic and physical mass mailing in which such legacy computer systems are used and in particular, where an electronic data stream can be derived from the mainframe print stream output so as to divert some or all of the print stream information which would otherwise be sent to a physical mail delivery system to an electronic delivery system. It is there seen that an electronic inserter can use the electronic delivery print stream so as to generate a plurality of electronic documents and from there to generate electronic mail pieces which via a message router, can be delivered to the intended recipient. The electronic mail pieces each contain an electronic document and possibly one or more electronic inserts. The electronic router can output such information via e-mail, pager, fax, printer or the like.

U.S. application Ser. No. 08/968,651, now abandoned having Attorney Docket Number E-685 further details a mail delivery system and method in which mass electronic mailing is accomplished by use of a database that includes a plurality of instruction templates, with each template corresponding to one of a plurality of electronic delivery mechanisms. An electronic inserter operates so as to generate electronic insert mail pieces while a computer processor is provided for associating each mail piece with at least one instruction template where each template corresponds to one of a plurality of electronic delivery mechanisms. The electronic mail piece is then delivered by the specified electronic delivery mechanism such as a worldwide web (web) browser, electronic mail (e-mail, pager, fax or printer).

For purposes of determining which of the plurality of mass mailing documents are to be sent via electronic means, U.S. application Ser. No. 08/968,498, now abandoned, having Attorney Docket Number E-653 describes a process for distributing messages from a sender to a recipient according to distribution preferences of the sender and the reception preferences of the recipient so that a sender can compose a message and define a set of preferences that indicate a destination, method of delivery, delivery media, class of service, carrier and other requirements pertaining to the message while the recipient can define preferences that indicate how that recipient prefers to receive messages, as well as the methods that are available for transmission. The sender thereby dispatches the message according to the sender's preferences and the recipient's preferences are analyzed to develop a set of routing rules that govern the message delivery process. Conflicts in the routing rules are resolved so that the message can be reformatted if needed, and feedback about the distribution can be provided to the sender so as to assist the sender in ascertaining the quality of service with respect to the delivery of the message to the recipient.

The present invention is directed to an improved system and method for presenting and processing primary documents, especially primary customer documents such as bills, where such primary documents may further be presented with one or more secondary documents (called "inserts").

SUMMARY OF THE INVENTION

The present invention is directed to a digital document delivery system and method, particularly for use on the Internet and particularly for presentation of electronic bills to a customer with a mechanism for payment thereof by the customer. The digital document delivery system comprises subsystems which work together so as to provide a generalized capability to allow an end-user with an Internet browser to view an electronic version of the customer's bill which would have otherwise been printed, but which is now presented in hypertext markup language (HTML) or similar format. The recipient can then pay the bill that he or she is viewing.

The digital document delivery system comprises four subsystems which typically execute on four separate servers.

A print stream separator in combination with an electronic inserter determines which primary and secondary documents are to be presented electronically to the customer. In order to perform this task, the print stream separator separates an incoming print stream into a physical and electronic delivery print steam, with this separation based upon customer preference data. The electronic inserter then determines what secondary or "insert" documents are to be electronically referenced to the primary document as sent to a customer. These insert documents are generally referenced to the primary documents by hypertext links (sometimes called "hotlinks"). A router instruction processor (RIP) receives "send requests" messages from the electronic inserter and generates "bill request" therefrom. Each bill request is sent to a bill processing server (BPS). The RIP is responsible for collecting status information regarding the bill to be processed, as well as to make such information available to the submitting process.

The BPS acts as a fulfillment center and is responsible for monitoring the status of an interactive bill presentation server (IBPS) so as to determine when the IBPS has received the print stream data which will be transformed into a viewable electronic document. The BPS is able to respond to IBPS requests for data, including links to other worldwide web sites. The BPS is able to send e-mail messages to bill recipients so as to notify them when their electronic bill is ready for viewing. The BPS is also able to respond to bill payment requests from the end-user and to appropriately control the modification of customer debt, remittance and status data as stored in an account database.

The IBPS is responsible for interactivity with a customer's web browser. The IBPS takes the print stream data and converts it to a form viewable using a web browser. It also sends status information back to the BPS regarding the status of the bill, including if the customer has requested that the bill be paid while viewing same.

Thus the document delivery system presents an electronic document to a customer by use of incoming traditional print stream data. In addition to a print stream separator and electronic inserter, the document delivery systems includes a router instruction processor, a bill processing server receiving instructions from the router instruction processor, and an interactive bill presentation server for receipt of instructions from the bill processing server and in response to said instructions and receipt of the print stream data, generating an electronic version of the print stream data for presentation in an electronic form, as well as for receipt of response information from the customer concerning a document presented to the recipient, including presenting the response information to the bill processing server.

BRIEF DESCRIPTION OF THE DRAWINGS

For a fuller understanding and the nature of the object of the present invention, reference should be made to the following detailed description, taken in conjunction with the following drawing in which.

DETAILED DESCRIPTION

As used throughout this description, the words "user" and "customer" are synonymous, as are the words "bill" and "primary document" and the words "insert" and "secondary document". Definitions of acronyms are presented in Table 1.

Figure 1A:
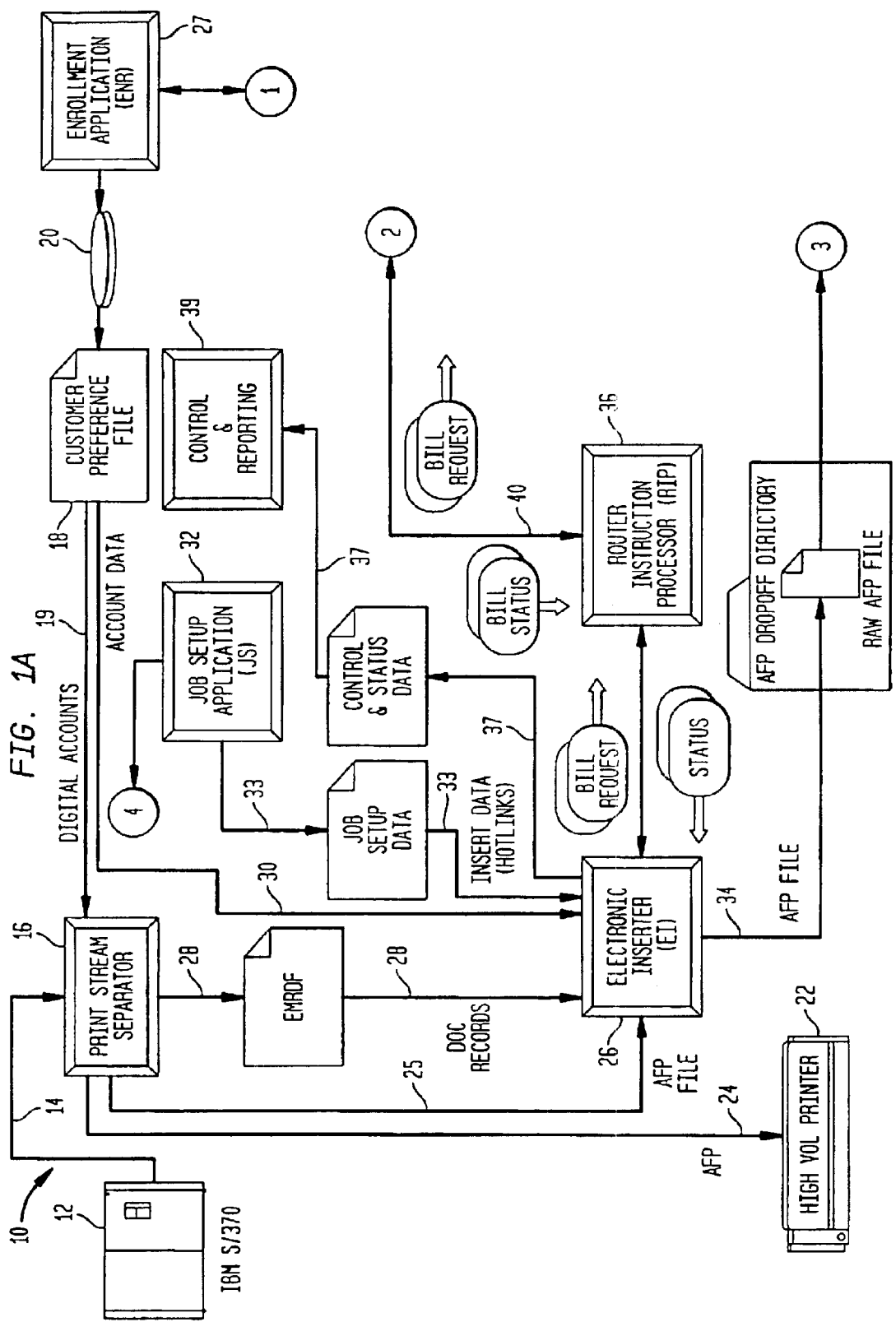
FIGS. 1A and 1B form an overall block diagram of a digital document delivery system according to the present invention.
Figure 1B:
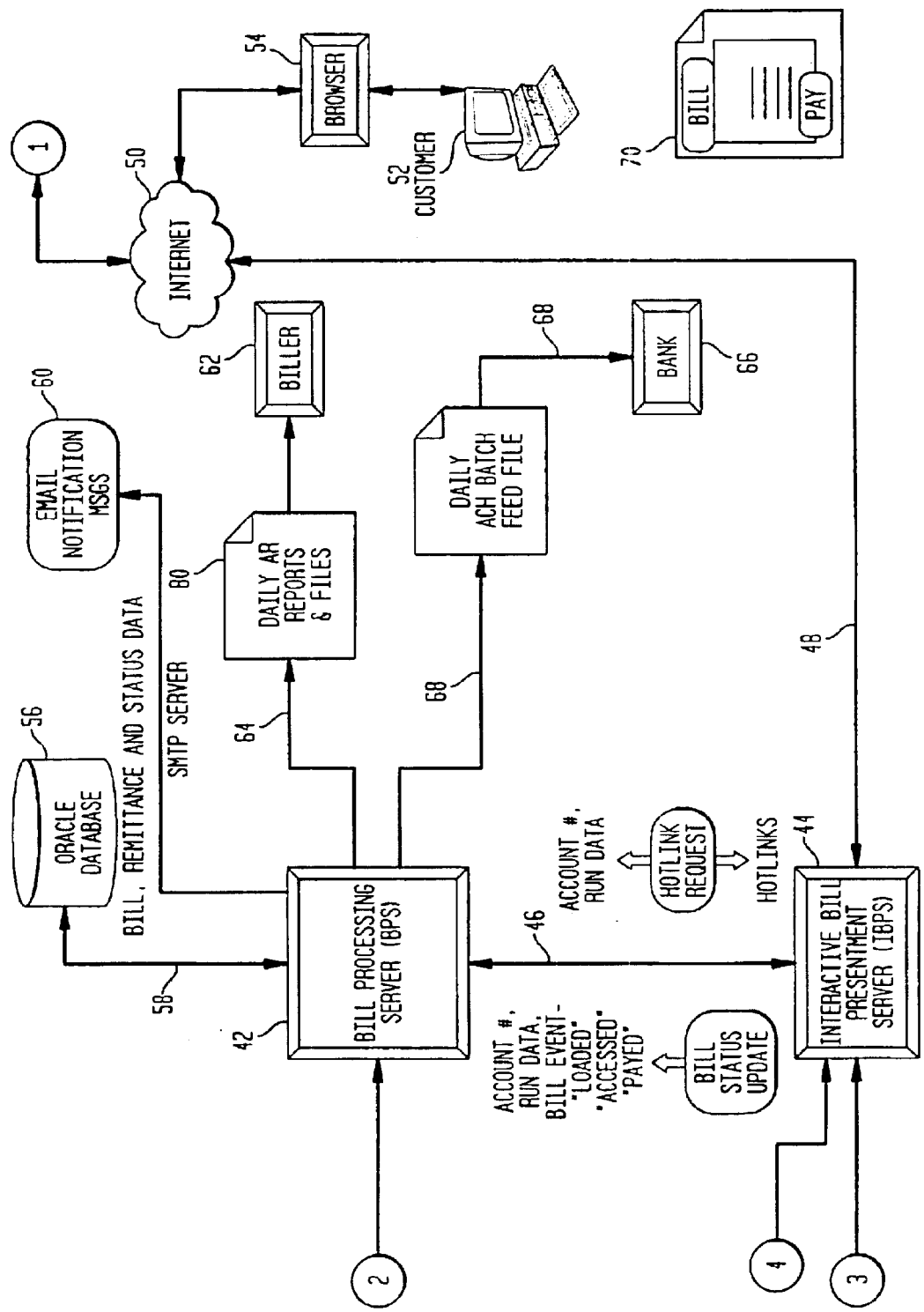

As best seen in FIGS. 1A and 1B, a digital document delivery system 10 comprises a number of functional elements which combine to provide a system for electronically delivering documents to a recipient which would typically otherwise be generated in hard copy form. As an overview of such a system, a digital computer 12 is shown which in many applications may be a mainframe computer of the legacy type commonly used for generating customer billing. This computer generates a print data stream 14 which typically represents a stream of customer bills or the like. This print data stream is presented to a print stream separator 16. The print stream separator also receives customer preference data forming part of a customer preference file 18 via data path 19. The customer preference file forms part of the customer preference database 20 for all of the customers. Typically, this customer database contains information concerning the customers of a company which periodically generates bills to its customers. This information typically includes customer account information, mail address information, electronic mail (e-mail) address, and other demographic information concerning the customer (e.g., age, sex, hobbies, occupation) which may be relevant for purposes of generating billing or insert information. The information relevant to deciding whether a specific customer desires electronic delivery of documents, and, if so, the demographic information relevant to secondary document selection (e.g., age, sex, hobbies, occupation, etc.), is transferred to the print separator via data path 19.

The print stream separator receives this information along with the print data stream 14 and determines which print data should be sent to a high speed printer 22 via hard copy output data stream 24 and which information should be presented to an electronic inserter 26. The print data sent to the electronic inserter includes an electronic print stream 25 representing the primary document to be electronically delivered. The print data also includes electronic mail run data in a specific format known as Electronic Mail Run Data File Specification (EMRDF) by means of an electronic output data stream 28. This data contains information concerning secondary documents to be associated with the primary document, with the secondary document data based upon the specific customer preference file.

The electronic inserter also receives customer account information and general customer information via data path 30 which forms part of the customer preference file 18. The account information contains general customer information, such as postal mailing addresses, e-mail addresses, bank account information and the like. It is also directly transferred from the customer preference database to the electronic inserter via data path 30. Of course, other information could be included, such as customer facsimile number, beeper number and the like for purposes of primary document notification.

The electronic inserter performs a function similar to that performed by inserting systems that generate inserts to accompany customer bills when bills are generated in hard copy.

The electronic inserter also receives information from a job set-up application module 32 which contains information concerning the types of inserts which are available for insertion by the electronic inserter and the electronic slot location for these inserts. This information concerning the specific job is known as job set-up data and contains information concerning hypertext links to electronic locations where such insert information is available. Thus, the electronic inserter need not actually generate the specific insert information to accompany the customer bill, but, rather, need only include the electronic link to such information for ultimate presentation to the customer in an electronic form. For example, accompanying a customer utility bill might be one or more links which when clicked upon in a browser, such as the Netscape Navigator™ browser or Internet Explorer™ browser, would cause the user to connect to that link for presentation of specific insert information, which may be an advertisement, informational data or the like. The electronic inserter 26 thus performs a function analogous to a hard copy inserting system but without the need for electronically generating an analogous electronic copy of each insert but rather electronically generating information regarding a link for obtaining such information when the customer desires to view it.

The output of the electronic inserter is typically a file in AFP format. This output is presented on data path 34 of the electronic inserter. In this way, the file structure for the bill is in the same format as that which would be presented if print output were to be generated. Of course, other file formats could be used.

The electronic inserter communicates with a router instruction processor (RIP) 36. The RIP communicates with the electronic inserter via communication path 38 so as to send status information to the electronic inserter as well as to receive bill requests (BR) from the electronic inserter. The bill request instructs the RIP to generate a bill request via communication path 40 to a bill processing server (BPS) 42. The bill processing server also communicates via communication path 40 with the RIP to send bill status information to the RIP. Information regarding secondary documents to be associated with the primary document is also transferred to the RIP by the electronic inserter.

In operation, the RIP sends the bill request to the BPS so as to initiate the generation of a notification to the appropriate customer.

The BPS monitors the interactive bill presentation server (IBPS) 44 via communication path 46. The IBPS is responsible for receiving the electronic print data stream files via communication path 34 and processing these documents so as to be later presentable to the customer. It is only after the documents have been so pre-processed that the customer can actually view the primary document (bill) and the associated secondary documents (inserts) via a web browser over communication path 48 forming part of the Internet. The IBPS is also responsible for generating account information known generally as bill status update information which is communicated to the BPS. This bill status update information typically includes the customer account number, the date the bill was run, whether the bill has been loaded, whether it has been accessed by the customer, whether it has been paid by the customer and the like. Some of this information as generated by the IBPS is received via communication path 48 from the customer at his or her computer via the associated browser software 54 that is run on the customer's computer 52.

Figure 3:
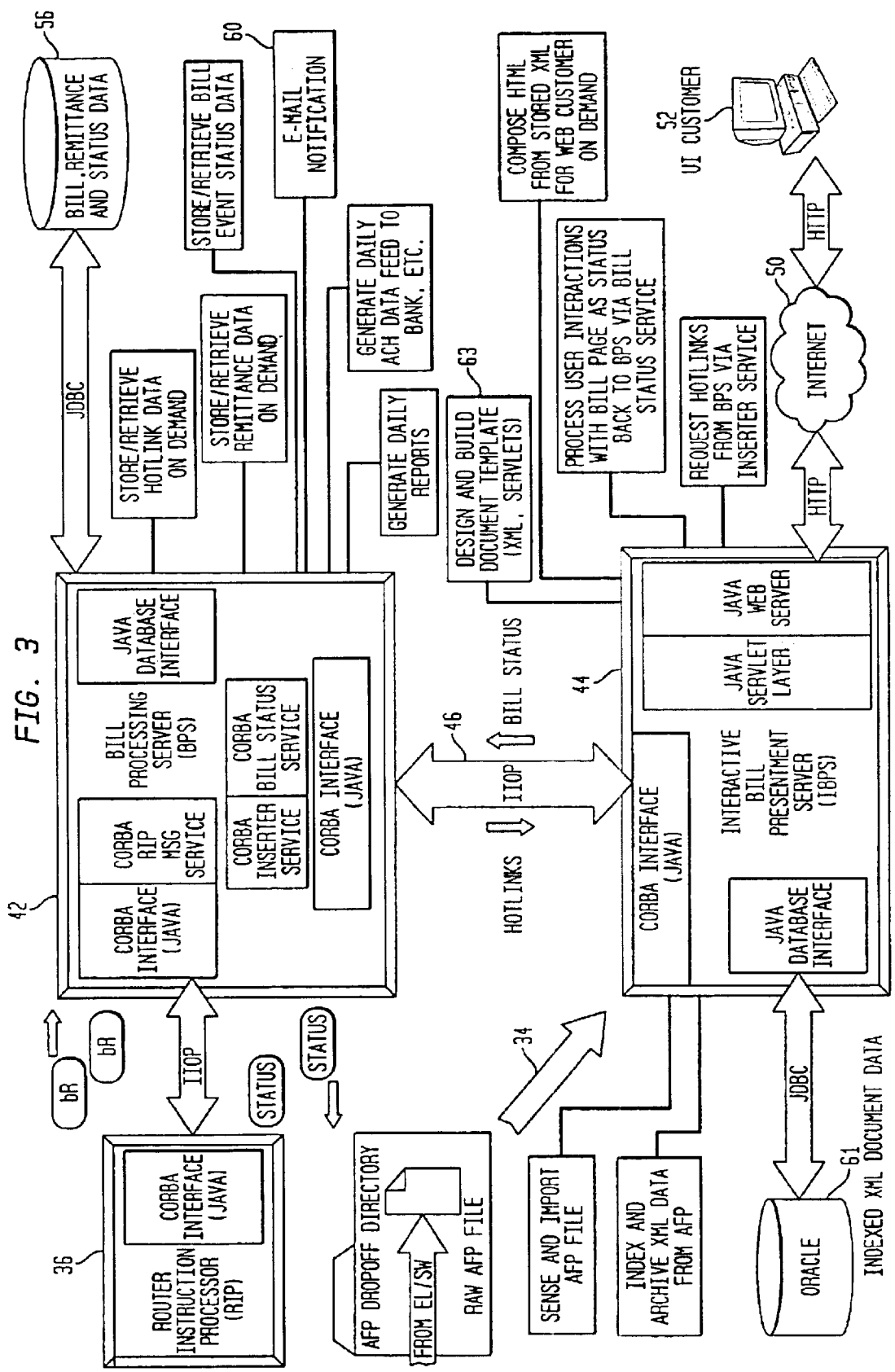
FIG. 3 is a block/flow diagram of the router instruction processor, bill processing server and interactive bill presentment server shown in FIGS. 1A and 1B.

In the preferred embodiment of the present invention, the IBPS generates the Internet browser viewable data stream when requested by the customer by use of the @Work Technologies Internet billing system known as the WorkOut™ Internet Billing System for generating browser viewable information such as in hypertext markup language (HTML) or other browser compatible languages (now or in the future) such as Extensible Markup Language (XML) and Java. As seen in FIGS. 1A, 1B and 3, it should be noted that in operation the IBPS receives the raw print data from the electronic inserter and generates an intermediate document corresponding to this print data using the XML language, which in turn is stored and indexed in intermediate document database 61, such as an Oracle™ database. Part of the information for generating this intermediate document is derived from design and build document templates 63. The location for placement of secondary document links based upon the received priority of the secondary document from the EMRDF file, and the overall design of the primary document, can be stored in these templates.

The IBPS receives the specific links (called "hotlinks") for the secondary document from the BPS. The BPS also acts as an electronic "traffic cop", by not allowing the IBPS to generate viewable documents unless the BPS has determined that all related documents and account information is ready for viewing.

The BPS 42 communicates with a bill remittance and status data database 56 via communication path 58 for retrieving and updating bill remittance and status data concerning customer bills based upon information received by the bill processing server from the IBPS which in turn receives information from the customer via the Internet and the associated browser communicating with the Internet.

The BPS furthermore is responsible for notifying the customer that a bill or other information is available for viewing via the Internet. The BPS performs this task in any of a plurality of manners, such as by generating an e-mail notification message which can be sent over the Internet to the customer's e-mail address as diagrammatically shown by e-mail event 60. Of course, other methods could be used by the BPS to notify the customer, such as generating a facsimile message and sending it via facsimile to the customer's facsimile machine, by generating a beeper message for presentation to the customer's beeper; or even by generating a print mail message to be delivered to the customer's mail address.

The BPS is also responsible for generating daily reports concerning the overall status of the digital document delivery system. These reports can be communicated to a biller module 62 via communication path 64 and may contain such information as daily account receivable reports, information concerning customers that have not paid their respective bills for a certain period of time, customers who have not viewed a bill after a certain period of time, etc.

The BPS is responsible for generating information for presentation to an associated bank 66 via communication path 68. Such information would typically include daily ACH Batch Feed File information and any other information which the proprietor of the digital document delivery system wants to communicate with its associated bank.

TABLE 1

| ACRONYMS | DEFINITIONS |
| --- | --- |
| ACH | Automated Clearing House |
| AFP | Advanced Format for Printing |
| ASCII | American Standard Code for Information Exchange |
| CORBA | Common Object Request Broker Architecture |
| EBCDIC | Extended Binary Coded Decimal Interchange Code |
| HTML | Hypertext Markup Language |
| HTTP | Hypertext Transport Protocol |
| IIOP | Internet Inter-ORB Protocol |
| JDBC | JAVA Database Connectivity |
| MRDF | Mail Run Date File |
| ORB | Object Request Broker |
| PDF | Portable Document Format |
| SMTP | Simple Mail Transfer Protocol |
| XML | Extended Markup Language |

Module Details

Details of the modules described above so as to achieve the stated operation are presented in Table 2.

Figure 2:
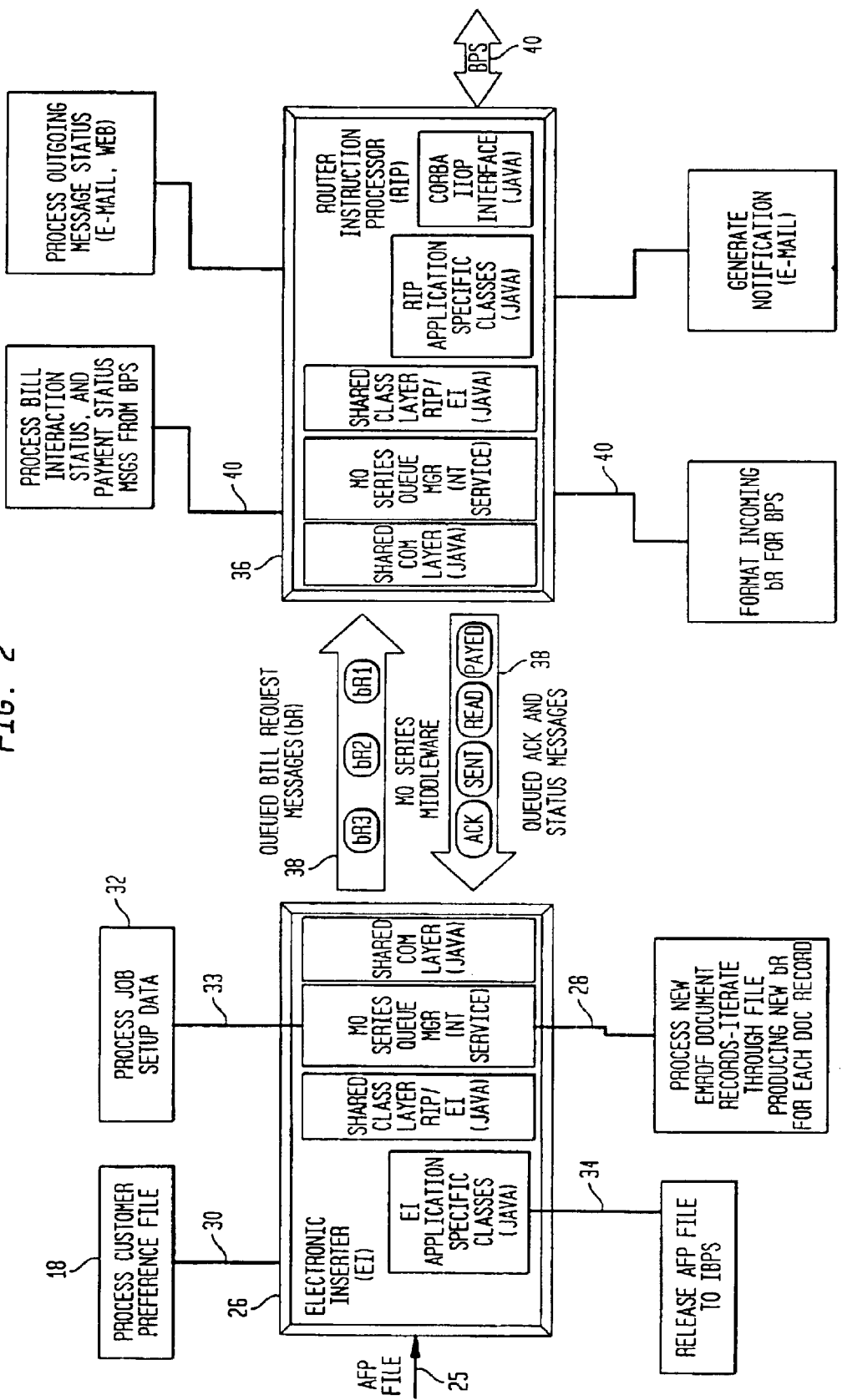
FIG. 2 is a block/flow diagram of the electronic inserter and router instruction processor shown in FIGS. 1A and 1B.

FIGS. 2 and 3 show details of the modules as well as the objects and language protocols used in the preferred embodiment of the present invention.

The print stream separator, electronic inserter, RIP, BPS and IBPS can be implemented on computer servers; e.g. Intel processor based servers using Microsoft Windows NT™ on UNIX™ operating systems. A high level object oriented language e.g. Sun Microsystems' JAVA language can be preferably used to implement the specific instructions for performing above-described tasks.

TABLE 2

| MODULE | FUNCTION |
| --- | --- |
| Enrollment Application Module 27 | Capture customer account number, full name of customer, email address of customer, checking account number, customer's account bank name, bank routing number, WEB password |
| Print Stream Separator 16 | Based on customer account number, split out documents destined by digital delivery, send these documents as AFP file. |
| Electronic Inserter 26 | Get data from Job Setup Module 32, customer preference file from customer preference database 20, print stream separator 16 and EMRDF output, compose bill request objects (BR), receive status messages from RIP, control AFP feed to IBPS. |
| Job Setup Application 32 | Produce file of inserts in the form of hotlinks that are logically assigned to physical inserter bins. |
| Router Instruction Processor (RIP) 36 | Service incoming requests from multiple clients (EIs), route requests to FAX, EMAIL, WEB, LOCAL PRINT, and PAGER, issue notifications based on status received, process status back to clients. |
| Database Account 56 | Store remittance data, bill data, and status data for digital bills. |
| Bill Processing Server (BPS) 42 | Save and retrieve bill data to the database, service CORBA requests for hotlinks from IBPS, process bill status messages from IBPS back to the RIP, issue reports and initiate payments feeds. |
| Interactive Bill Present Server (IBPS) 44 | Process interactive events performed on the bill by customers, render HTML to customers based on downloaded servlets and stored XML rules, design document templates. |

Summary of Operation of Digital Document Delivery System

In view of the description above, the overall operation of the digital document delivery system is to generate a print stream of data, typically in a format compatible with that used in current hard copy printer print stream data, such as in the AFP file. This information is generated via an electronic inserter which receives data concerning a customer's bill as well as inserts to be presented in that customer's bill based upon the associated customer's preference file. This information is communicated to an interactive bill presentation server which takes the information and generates an output (based upon pre-processed information and downloaded servlets concerning the design of the bill) which is compatible for viewing such information over the Internet by means of browser software executed on the customer's personal computer so as to generate screens of information which look essentially similar to a hard copy bill and associated inserts that the customer would receive had the bill been generated by traditional print means. This is shown diagrammatically in FIGS. 1A and 1B as bill 70 with its associated inserts.

The interactive bill presentation server is under the control of the bill processing server which, in turn, is responsible for updating associated account database that contains information concerning the status of bills, payments thereof, etc., by the associated customer, as well as for notifying the customer of an existence of a bill for viewing via a web browser. The bill processing server, in turn, communicates with a router instruction processor which interacts with the electronic inserter, as well as informing the bill processing server of the generation of an electronic print stream associated with a bill and associated inserts for presentation to the interactive bill presentation server. The interactive bill presentation server receives instructions from the customer via the Internet which, in turn, are communicated to the bill processing server for updating bill remittance data and the like, upon the customer indicating his or her desire to pay an associated bill received electronically. Bills are only made available to a customer when all necessary information for viewing has been pre-processed. An enrollment application module is also made available to prospective/current customers to allow them to create/update information in their customer preference file.

The overall result of the present digital document delivery system and method is an electronic analog of the traditional hard copy printed bills generated by traditional high speed printer and mail inserting systems and associated computers that instruct such systems with regard to generating bills and associated inserts. The present invention eliminates the paper associated with traditional print systems, provides an electronic analog to the bill received so that the bill format is familiar to the customer, provides easy means for the customer to pay such bills, as well as to view associated inserts having links sent with the bill.

Furthermore, the overall digital document delivery system and method allows the proprietor of such an overall system to monitor the activities of its customers with respect to when they view their bills, what inserts they retrieve, when they pay their bill(s), etc., thereby giving the proprietor of the digital document delivery system better information concerning its customer base, their likes and dislikes, based upon their viewing or not viewing associated insert information, and the like. This, in turn, allows the proprietor of the digital document delivery system to modify the customer preference file for associated customers so as to present to such customers inserts which would be more desirable for viewing by that customer, and thereby enhancing the overall delivery of bills and inserts to its customers.

Although a web browser is used in the present invention for Internet presentation of information to the customer and for receipt of information from the customer, any electronic communication means, including an Intranet or any other form of electronic delivery which is viewable by a customer with the customer's associated viewing equipment (which would typically be a browser program run on a personal computer), could be utilized for presentation and receipt of electronic information to the associated customers of the proprietor of the digital document delivery system.

Furthermore, although the customer bill information is shown as being separated by a print stream separator 16 with the original customer bill information generated by a digital computer where at least some of the information may be presented to a traditional high volume printer, all of the information could, in fact, be generated in electronic form without the need for such a print stream separator. Furthermore, the format of such bill information need not be in any specific form prior to generation of the electronic version for viewing by the customer's browser as generated by the interactive bill presentation server.

Although the electronic inserter, router instruction processor, bill processing server and interactive bill presentation server are shown as separate modules, some or all of these modules may, in fact, reside on the same digital computer server.

In summary, the digital document delivery system provides a primary document (such as a bill) and associated secondary documents (such as inserts) for each identified user (customer) having an associated customer preference file. The selection of secondary documents can be based upon information in a customer's preference file. The customer can communicate with the digital document delivery system, obtain information therefrom, and perform tasks therewith (e.g., pay a bill).

In the foregoing specification, the invention has been described as referenced to specific embodiments thereof. It will, however, be evident that various modification and changes may be made thereto without departing from the broader spirit and scope of the invention. The specification and drawings are, accordingly, to be regarded as illustrative rather than in a restrictive sense.

What is claimed is:

1. A digital document delivery system for presentation of electronic documents for user viewing electronically, wherein the digital document delivery system comprises:

A) an electronic inserter that generates an electronic print stream output with information to be presented to users of the system, said information containing information regarding at least one primary document and information concerning N secondary documents to be associated with the primary document, where N is an integer equal to or greater than zero;

B) a bill processing server communicating with the electronic inserter, wherein the bill processing server interacts with an associated account database for maintaining information concerning the primary document delivered to the user and any response from the user concerning said primary document;

C) an interactive bill presentation server for receipt of the electronic print stream from the electronic inserter, for generating electronically viewable data corresponding to the primary document as well as for presenting electronic information related to any associated secondary documents, the interactive bill presentation server communicating with the bill processing server and with the user, including receipt of response information from the user for presentation to the bill processing server; and D) an electronic enrollment application module for receipt of information from a prospective or current user so as to create or modify a user preference file, wherein the information concerning a user as recorded in the user preference file is used by the electronic inserter to determine each secondary document, if any, to be associated with a particular user's primary document;

wherein at least some of the data in the user preference file is communicated to a print stream separator, the print stream separator having an input for receipt of print stream data and having a first output associated with the electronic print stream presented to the electronic inserter, and also having a second output in an electronic mail data run file specification associated with the electronic print stream for presentation to the electronic inserter so as to indicate which secondary documents should be generated as part of the output electronic print stream of the electronic inserter, and wherein the print stream separator generates a second output of print stream data for generation of hard copy print output for those users that do wish to receive hard copy primary documents.

2. A digital document delivery system as defined in claim 1, wherein each user has an electronic mail address and wherein the bill processing server informs a specific user that an electronic document is available for viewing by generating an electronic mail message directed to the specific user's electronic mail address.

3. A digital document delivery system as defined in claim 1, wherein the bill processing server further has means for generating report information concerning the daily activity of the electronic primary documents viewed by associated users, as well as any responses by those users.

4. A digital document delivery system as defined in claim 3, wherein the bill processing server further comprises means for generating periodic data concerning the activities of the users for presentation to a third party institution.

5. A digital document delivery system as defined in claim 1, wherein the interactive bill presentation server generates the user viewable primary document and links to each associated secondary document information in hypertext markup language format.

6. A digital document delivery system as defined in claim 1, wherein the electronic inserter further receives job setup data from an associated job setup application module which contains information regarding the user.

7. A digital document delivery system as defined in claim 6, wherein the electronic inserter generates control and status information concerning the operation of the electronic inserter, and wherein the digital document delivery system further comprises a control and reporting module for receipt of the control and status information from the electronic inserter.

8. A digital document delivery system as defined in claim 1, wherein the second output in the electronic mail data run file specification associated with the electronic print stream for presentation to the electronic inserter indicates relative priorities of secondary documents to be generated as part of the output electronic print stream of the electronic inserter.

9. A digital document delivery system as defined in claim 8, wherein the data generated by the electronic inserter is in the AFP format.

10. A digital document delivery system as defined in claim 1, wherein the bill processing server communicates with the electronic inserter via a router instruction processor, which in turn receives commands from the electronic inserter regarding documents to be deliverable to users and wherein the router instruction processor processes these commands and communicates these commands to the bill processing server.

11. A digital document delivery system as defined in claim 1, wherein the bill processing server further has means for generating a notification message directed to the user for informing the user of the existence of at least an electronic primary document for viewing by the user.

12. A digital document delivery system as defined in claim 11, wherein the electronically viewable data generated by the interactive bill presentation server is in a form for viewing by a browser program.

13. A method of delivering digital documents for presentation of electronic documents for user viewing electronically, comprising the steps of:

A) generating an electronic print stream output with information to be presented to users, said information containing information regarding at least one primary document and information concerning N secondary documents to be associated with the primary document, where N is an integer equal to or greater than zero;

B) interacting with an associated account database for maintaining information concerning the primary document delivered to the user and any response from the user concerning said primary document;

C) receiving the electronic print stream for generating electronically viewable data corresponding to the primary document as well as for presenting electronic information related to any associated secondary documents, and communicating with the user, including receipt of response information from the user for modifying the account database;

D) enrolling users and receiving information so as to create or modify a user preference file, wherein the information concerning users' preferences is recorded in the user preference file and using the information to determine which secondary documents, if any, should be associated with a particular user's primary document as part of the output electronic print stream; and E) using at least some of the data in the user preference file to identify whether particular users wish to receive electronic primary documents and generating a hard copy print output for those users whose preference data indicates that they wish to receive hard copy primary documents.

14. A method as defined in claim 13, wherein each user has an electronic mail address and wherein the method further comprises the step of informing a specific user that an electronic document is available for viewing by generating an electronic mail message directed to the specific user's electronic mail address.

15. A method as defined in claim 13, wherein the method further comprises the step of generating report information concerning the daily activity of the electronic primary documents viewed by associated users, as well as any responses by those users.

16. A method as defined in claim 13, wherein the electronically viewable data and the electronic information related to any associated secondary document is in hypertext markup language format.

17. A method as claimed in claim 13, further comprising the step of generating a notification message directed to the user for informing the user of the existence of at least an electronic primary document for viewing by the user.

* * * * *